(12) United States Patent
Volpentest

(10) Patent No.: US 11,860,740 B1
(45) Date of Patent: Jan. 2, 2024

(54) SYSTEM AND METHOD FOR CONTROLLING BACKUP AND RECOVERY SOFTWARE IN A MULTIPLE CLUSTER ENVIRONMENT

(71) Applicant: Charles Schwab & Co., Inc., San Francisco, CA (US)

(72) Inventor: Tony Volpentest, Gilbert, CA (US)

(73) Assignee: Charles Schwab & Co., Inc., San Francisco, CA (US)

( * ) Notice: Subject to any disclaimer, the term of this patent is extended or adjusted under 35 U.S.C. 154(b) by 1266 days.

(21) Appl. No.: 15/080,524

(22) Filed: Mar. 24, 2016

Related U.S. Application Data

(60) Provisional application No. 62/138,673, filed on Mar. 26, 2015.

(51) Int. Cl.
*G06F 16/00* (2019.01)
*G06F 11/14* (2006.01)
*G06F 16/84* (2019.01)

(52) U.S. Cl.
CPC .......... *G06F 11/1451* (2013.01); *G06F 16/88* (2019.01); *G06F 2201/815* (2013.01)

(58) Field of Classification Search
CPC . G06F 11/1451; G06F 16/88; G06F 2201/815
USPC ........................................................ 707/654
See application file for complete search history.

(56) References Cited

U.S. PATENT DOCUMENTS

| | | | |
|---|---|---|---|
| 8,219,769 B1* | 7/2012 | Wilk ................... | G06F 11/1464 707/640 |
| 10,146,634 B1* | 12/2018 | Bishop ................ | G06F 16/128 |
| 2010/0070725 A1* | 3/2010 | Prahlad .............. | G06F 11/1453 711/162 |
| 2012/0150815 A1* | 6/2012 | Pafumi ............... | G06F 11/1658 707/679 |
| 2013/0061014 A1* | 3/2013 | Prahlad .............. | G06F 11/1453 711/162 |
| 2014/0250093 A1* | 9/2014 | Prahlad .............. | G06F 11/1453 707/696 |

* cited by examiner

*Primary Examiner* — Monica M Pyo
(74) *Attorney, Agent, or Firm* — HARNESS, DICKEY & PIERCE, PLC

(57) ABSTRACT

A system and method converts a list that may be used for tracking, into an input that can be used by backup and recovery software to avoid backing up certain virtual machines in a multiple cluster backup configuration, network coupled, environment.

12 Claims, 3 Drawing Sheets ns system for controlling backup and recovery software according to one embodiment of the present invention.

SYSTEM AND METHOD FOR CONTROLLING BACKUP AND RECOVERY SOFTWARE IN A MULTIPLE CLUSTER ENVIRONMENT

RELATED APPLICATION

This application claims the benefit of U.S. Provisional Patent Application Ser. No. 62/138,673, entitled "Method and Apparatus for Controlling Backup and Recovery Software in a Multiple Cluster Environment" filed by Tony Volpentest on Mar. 26, 2016 and is hereby incorporated by reference in its entirety.

FIELD OF THE INVENTION

The present invention is related to computer software and more specifically to computer software for controlling backup and recovery software.

BACKGROUND OF THE INVENTION

Virtual Machines may be defined on each of one or more computer systems. A virtual machine is a process on a server that appears to be or simulates a separate physical machine or server. A single server can have multiple virtual machines running on it. The resources of a virtual machine include storage, such as memory or disk storage, and are considered to be a part of the virtual machine, as used herein.

One or more servers that can support virtual machines, and the resources they use, may be logically grouped into cluster backup configurations (also referred to as "clusters") and defined to backup and recovery software. Backup and recovery software (also referred to herein as "backup software") allows virtual machines, and/or their resources, to be backed up. Some backup software uses a cluster backup configuration-based control system, in which commands relate to a certain cluster backup configuration, but not others. The software allows some virtual machines on a cluster backup configuration to be excluded from being backed up. Such an arrangement is suboptimal. What is needed is a system and method that can control backup and recovery software backing up one or more cluster backup configurations.

SUMMARY OF INVENTION

A system and method distributes to each of several cluster backup configurations that can run one or more virtual machines, a master list of virtual machine identifiers. The master list identifies the virtual machines that should not be backed up in every cluster backup configuration. For each cluster backup configuration that receives the list, the list includes the names of one or more virtual machines that are part of the cluster backup configuration, one or more virtual machines that, though they are not part of the cluster backup configuration, will migrate to that cluster at a future time, and the names of one or more virtual machines that are not, and will not be part of that cluster backup configuration. Virtual machines on the list that are not part of one cluster backup configuration are part of another cluster backup configuration on which backups occur, and should not be backed up on whichever cluster backup configuration they reside at the time.

BRIEF DESCRIPTION OF THE DRAWINGS

FIG. 4 is a flowchart illustrating a method of backing up virtual machines on cluster backup configurations at different times according to one embodiment of the present invention.

DETAILED DESCRIPTION OF A PREFERRED EMBODIMENT

Figure 1:
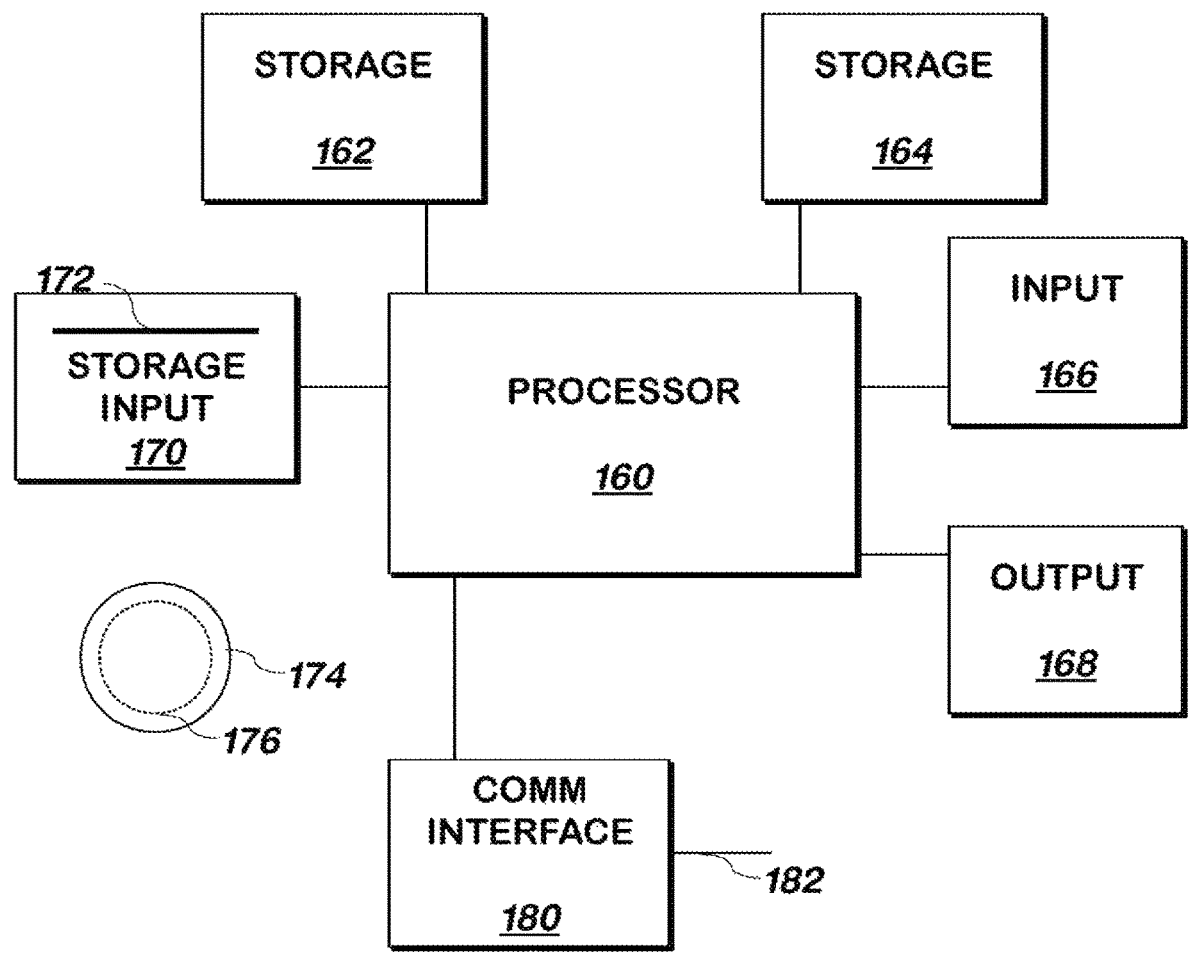
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. All storage elements described herein may include conventional memory and/or disk storage and may include a conventional database. All elements of the system described herein may include any or all of at least one input, at least one output and at least one input/output and may include a hardware computer processor.

All system elements may include a computer processor system or other logic circuitry, designed or programmed via non transitory computer readable program code devices to operate as described herein and/or memory system. All system claim elements are to be interpreted as structural, the only nonce word to be used in claims is the word "means" and all other words are not to be interpreted as nonce words.

Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS T SERIES SERVER running the SOLARIS operating system commercially available from ORACLE CORPORATION of Redwood Shores, California, a PENTIUM-compatible personal computer system such as are available from DELL COMPUTER CORPORATION of Round Rock, Texas running a version of the WINDOWS operating system (such as XP, VISTA, or 7) commercially available from MICROSOFT Corporation of Redmond Washington or a Macintosh computer system running the MACOS or OPENSTEP operating system commercially available from APPLE INCORPORATED of Cupertino, California and the FIREFOX browser commercially available from MOZILLA FOUNDATION of Mountain View, California or INTERNET EXPLORER browser commercially available from MICROSOFT above, although other systems may be used. Each computer system 150 may be a SAMSUNG GALAXY NEXUS III commercially available from SAMSUNG ELECTRONICS GLOBAL of Seoul, Korea running the ANDROID operating system commercially available from GOOGLE, INC. of Mountain View, California. Various computer systems may be employed, with the various computer systems communicating with one another via the Internet, a conventional cellular telephone network, an Ethernet network, or all of these.

Figure 2:
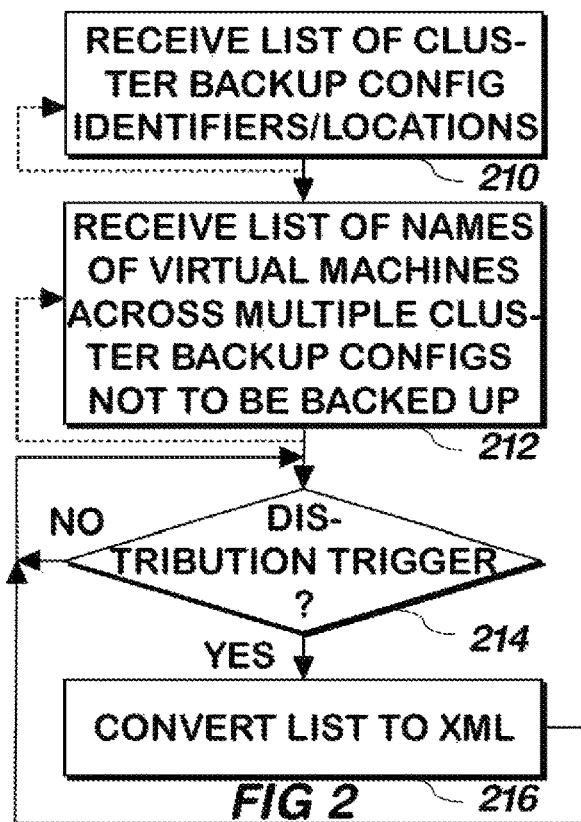
FIG. 2 is a flowchart illustrating a method of controlling backup and recovery software according to one embodiment of the present invention.

Referring now to FIG. 2, a method of causing backup software to avoid backing up of certain virtual machines on each of several cluster backup configurations is shown according to one embodiment of the present invention. A list of cluster backup configuration identifiers is received 210. The list may include the names of each cluster backup configuration, and may include location information describing the locations of the cluster on which the virtual machines reside. In one embodiment, the locations of the cluster backup configuration may already be defined, in which case only the names of the cluster backup configurations need be received. Cluster backup configuration names may be received and updated at any time as indicated by the dashed line in the Figure.

A list of names of virtual machines that are not to be backed up is received 212. In one embodiment, the machines not to be backed up may be spread across cluster backup configurations from among those whose names are received in step 210, though the cluster backup configuration on which the virtual machine resides at the time need not be specified on the list, and may not even be known by the author of the list, and thus, the list may be authored without regard for the particular cluster backup configuration on which a virtual machine resides at any time. In one embodiment, the list is in the format of a spreadsheet, such as a conventional EXCEL spreadsheet, commercially available from MICROSOFT CORPORATION of Redmond, Washington. The list may include, for each virtual machine, the reason the virtual machine is not to be backed up. Step 212 may be part of a continuously operating process, allowing the names of virtual machines not to be backed up to be modified at any time, as shown by the dashed line in the figure.

If a list distribution trigger occurs 214, the list may be converted 216 into an XML format, or another format that can be used by the backup and recovery software used to back up each cluster backup configuration as described above. A list distribution trigger may occur based on an event, such as an event that alters the list, for example, when a virtual machine is added to, or added to or removed from, the list. A list distribution trigger may occur based on time, such as before the backups of the cluster backup configurations are about to occur. A list distribution trigger may be a manual indication received from a system administrator to distribute the list.

The converted list is provided 218 to the backup and recovery software or to every cluster backup configuration whose identifiers were received in step 210 as described above, without regard for which cluster backup configuration contains data or provides other resources for a given virtual machine, to cause the backup and recovery software backing up the cluster backup configuration not to back up data and other resources of any virtual machine on the list. The converted list may be provided to every cluster backup configuration using the backup and recovery software. For each cluster backup configuration receiving the list, the list may contain any or all of the names of zero, one, or more virtual machines for which the cluster backup configuration is storing data or otherwise providing resources, names of one or more virtual machines for which the cluster backup configuration is not storing data or otherwise providing resources at the time of receipt of the list, but will later store data or provide resources for that virtual machine, and when such data is stored or such resources are provided on that cluster backup configuration, should not be backed up, and the names of one or more virtual machines that will never migrate to that cluster backup configuration.

A check may be optionally made 220 as to whether the registrations of the virtual machines that will not be backed up has been properly implemented on any one or more cluster backup configuration, for example, by querying the backup software to identify the virtual machines not to be backed up on a given cluster backup configuration, and checking against the converted list of virtual machines provided to it for errors. If errors are found, the list may be reapplied to that cluster backup configuration or to all of them.

The backup software, such as the conventional SIMPANA software commercially available form COMMVAULT of Oceanport, New Jersey, reads the list for each cluster backup configuration as a filter 222, causing the data and other resources for virtual machines with the names received in step 212 not to be backed up when the backup software backs up the data in data stores and other resources on that cluster backup configuration. Some or all other virtual machines that are stored on that cluster backup configuration will be backed up at such time. The method continues at step 214. Step 222 may operate as a continuous process in one embodiment, repeating at one or more times of the day, in the embodiment, in which the distribution trigger is not based on the backup time. This allows the backup and recovery software to reuse the converted list one or more times after the first use of it to exclude virtual machines from being backed up.

System.

Figure 3:
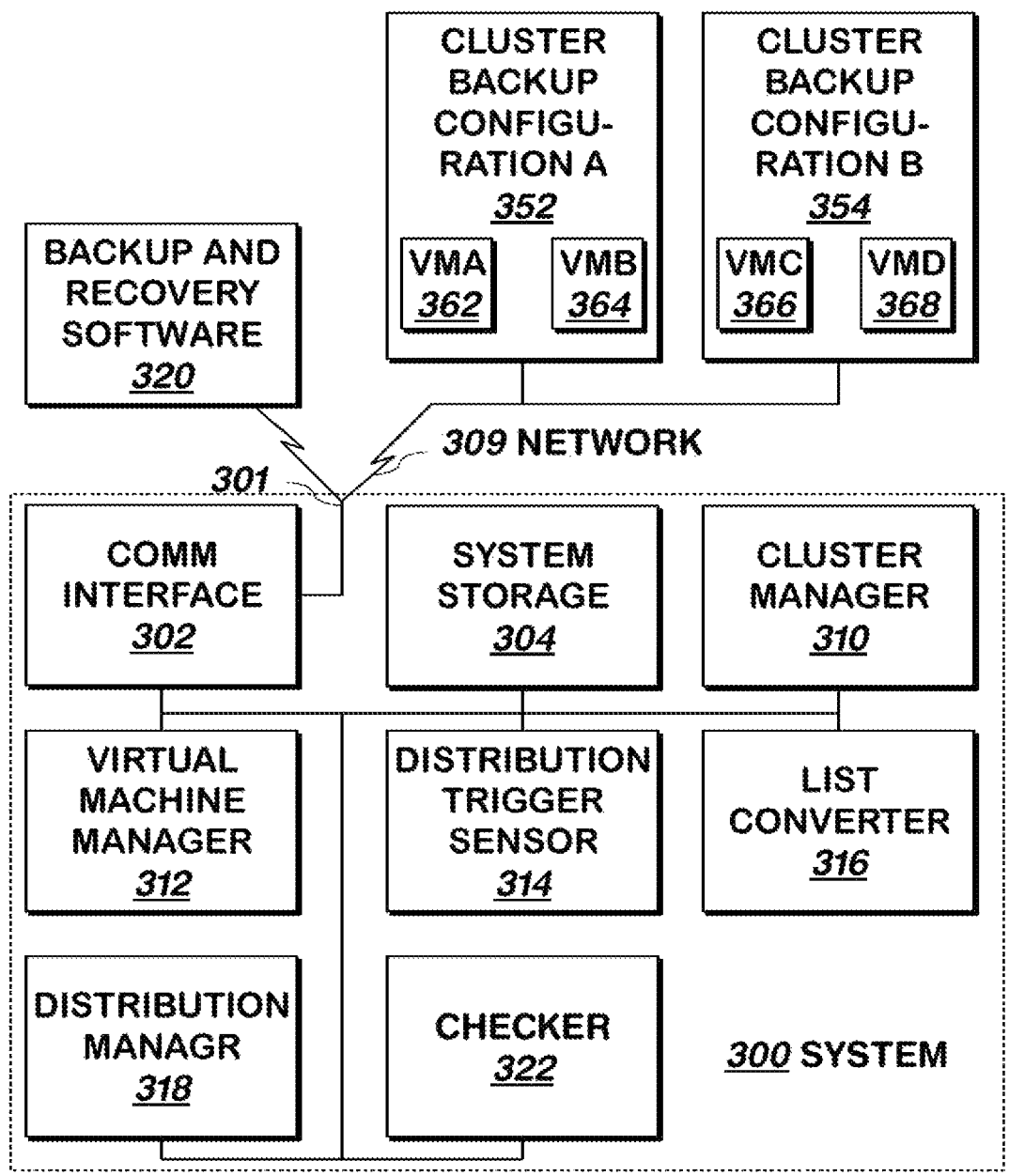
FIG. 3 is a block schematic diagram of a system for controlling backup and recovery software according to one embodiment of the present invention.

Referring now to FIG. 3, a system 300 for controlling backup and recovery software is shown according to one embodiment of the present invention.

Communication interface 302 includes a conventional TCP/IP compatible communication interface, running suitable communication protocols such as TCP/IP, Ethernet, or both.

Application interface 302 includes input/output 301, coupled to a network such as an Ethernet network, the networks of the Internet, or both. Unless otherwise described herein, all communication into, or out of, system 300 described below, is made via input/output 301 of communication interface 302.

Cluster manager 310 provides a user interface to allow a system administrator to enter cluster backup configuration identifiers as described above, which may include location information of such cluster backup configuration. Cluster manager 310 stores such information about the cluster backup configurations in system storage 304.

Names or other identifiers of virtual machines are received from a system administrator by virtual machine manager 312, which stores such information about the virtual machines into system storage 304. In one embodiment, the virtual machine manager 312 provides a user interface to the system administrator to allow such information to be received. In one embodiment, in conjunction with the names of the virtual machines, the reasons that the virtual machines are not to be backed up are also received and stored by virtual machine manager 312.

In one embodiment, the list of names of virtual machines is received into an EXCEL spreadsheet. The spreadsheet may be configured to allow for the exporting of the names of the virtual machines in an XML format that can be used by the backup and recovery software 320, described below. In one embodiment, to allow for such exporting into such format, a template of the XML file may be received, and imported into EXCEL by selecting the developer tab in Excel, and then selecting the import user interface control that appears as part of the XML area of such tab. The import tab requests the user to indicate how EXCEL should map attributes in the XML file into columns, and in the case of a COMMVAULT update subclient filters template file commercially available from COMMVAULT used as the template, the attributes "vmfilter", "equalsOrNotEquals", "type", "VirtualServer" and "OVERWRITE" are mapped to columns A through E, respectively. The resulting spreadsheet may then be saved onto disk and used to receive the list of virtual machine names.

To receive the list, the file is opened and the virtual machine server name, used to identify the virtual machine that currently or may reside in a cluster backup configuration, is added to a row of the EXCEL spreadsheet for each virtual machine that is not to be backed up, using the first column A. The second column in each row is set to a value of "1", and the third column in each row is set to a value of "10". The fourth and fifth columns are unchanged in every row and keep the values imported from the file.

Other columns may be used to keep track of other information about the virtual machines on the list. Such other columns may hold a description of the reason why each virtual machine is not to be backed up, the application or applications running on such virtual machine, and other information about such virtual machines, such as a contact person for that machine and the entity for which such virtual machine is operated, such as the department in the company for which such virtual machine is operated. The use of other information allows a single spreadsheet to be used for both tracking of virtual machines not backed up and for controlling the backup and recovery software, reducing errors from what would otherwise be two lists that could become out of sync.

In one embodiment, the conversion of the list to an XML format that can be used by the backup and recovery software, and the distribution of such XML-based list, is initiated via manual processes performed by the system administrator. In another embodiment, such conversion and distribution is automatically initiated by distribution trigger sensor 314. Distribution trigger sensor 314 senses the distribution triggers described above, either by sensing the addition or removal or both of one or more names of virtual machines to or from the list received by virtual machine manager 312, or by monitoring a system clock to identify a time that is before the next time that the virtual machines in the cluster backup configurations corresponding to the list received by cluster manager 310 will be backed up by the backup and recovery software, such time or times having been provided to it by a system administrator.

In one embodiment, distribution trigger sensor 314 uses both techniques, first monitoring a system clock to identify whether the time is within a threshold amount of time of the start of the backup and recovery process of the cluster backup configurations corresponding to the list received by cluster manager 310, and then at such time, comparing the list of virtual machines, and/or the list of cluster backup configuration identifiers with those copied into a separate area of system storage 304 at a time that was within a threshold amount of time of the immediately preceding backup of the cluster backup configurations corresponding to the list received by cluster manager 310 as described below. For example, if the backups occur at 2 AM on the day after each weekday, and the threshold is one hour, distribution trigger sensor 314 monitors the system clock and approximately at 1 AM on Tuesday, distribution trigger manager 314 compares the list of cluster backup configurations and/or virtual machines in system storage 304 at that time, with the list of cluster backup configuration identifiers and/or virtual machine names stored at 1 AM on the prior Saturday, when the last set of changes to the list were discovered as described herein. If there are any differences in such lists, (or if the list in the separate area of system storage 304 doesn't exist), distribution trigger sensor 314 signals list converter 316. Distribution trigger sensor 314 additionally stores the current version of the list of cluster backup configuration identifiers and the list of names of virtual machines stored in system storage 304 in the separate area of system storage 304, replacing the prior stored version of such list. Other techniques of detecting differences, such as by setting an indicator when any changes are made, checking the indicator at the threshold amount of time before the scheduled backup, if the indicator is set, converting and distributing the list, and clearing the indicator, may be used.

In another embodiment, distribution trigger sensor 314 is a part of virtual machine manager 312 and/or cluster manager 310, and upon sensing any changes to the list of virtual machine names, the list of cluster backup configuration identifiers, or both, distribution trigger sensor 314 signals list converter 316. In such embodiment, the separate area of system storage 304 need not be used, as changes cause the conversion and distribution of the list of names of virtual machines as soon as any changes are entered to the lists by the system administrator as described above.

In the embodiment in which the conversion and distribution of the list of names of virtual machines is initiated manually, a system administrator may signal list converter 316. If such embodiment, the system administrator may signal list converter 316 when the system administrator manually identifies one or more distribution triggers as described above or for any other reason.

When signaled, list converter 316 converts the list of names of virtual machines received by virtual machine manager 312 and stored in system storage 304 into an XML format that can be understood by backup software 320. In the embodiment using the EXCEL spreadsheet, EXCEL can perform such conversion. Using the developer tab of excel, in the XML area of such tab, the export user interface control is used to convert the five columns A-E described above into the XML format used by the backup and recovery software. A script may be written in the EXCEL program, for example, using VISUAL BASIC to automatically export the file when a change is made or when a change is made and the file is saved into system storage 304. List converter 316 then signals distribution manager 318, or the system administrator may signal distribution manager 318 manually, for example by executing a script implementing distribution manager 318.

When signaled, distribution manager 318 provides the XML converted list of virtual machine identifiers in system storage 304 either to the backup and recovery software or to each cluster backup configuration, optionally via the backup and recovery software 320. Backup and recovery software 320 is configured to back up all virtual machines 362-368 on cluster backup configurations 352-354 using the list of cluster backup configurations in system storage 304. If virtual machine B 364 is one of the virtual machines on the XLM converted list of virtual machines not to be backed up, backup and recovery software 320 will not back virtual machine B 364, but will back up virtual machine A 362, virtual machine C 366 and virtual machine D 368. In one embodiment, backup and recovery software 320 uses the converted list of cluster backup configurations stored on each cluster backup configuration or the converted list it received in order to identify the cluster backup configurations that it backs up, backing up all virtual machines on each such cluster backup configuration 352, 354 except for those on the converted list of virtual machines it uses as described herein.

In one embodiment, a system administrator may query backup and recovery software 320 after the list of virtual machines not to be backed up is provided to it, as described above, to verify that the virtual machines on the list have been accepted into the filtering component of backup and recovery software, so as to ensure that such virtual machines on the list are not backed up by backup and recovery software 320. In another embodiment, checker 322 retrieves the list of virtual machines being filtered by backup and recovery software 320 or being filtered (i.e. not backed up) on a particular cluster backup configuration, such as by querying backup and recovery software 320, and compares the list of virtual machines being so filtered with the list of virtual machines stored in system storage 304. If any differences are detected, checker 322 indicates such differences to the system administrator, so that suitable corrective measures may be employed and/or signals distribution manager 318 to redistribute the converted list of virtual machine identifiers either to all cluster backup configurations or to a one that is queried.

Selected Examples of Operation

Referring now To FIG. 4, examples of operation are shown according to one embodiment of the present invention. An XML converted list of identifiers of virtual machines is produced and distributed 410 to the cluster backup configurations 352, 354 as described herein at a time when virtual machine A 362 does not reside on cluster backup configuration A 352 as shown in FIG. 3, for example, because it resides on cluster backup configuration B 354. The XML converted list of identifiers of virtual machines distributed to each cluster backup configuration is the same list. Virtual machine A is one of the identifiers of virtual machines not to be backed up. At a first backup 412, virtual machine A 362 is not backed up 412 by backup and recovery software 320 on cluster backup configuration B 354, but virtual machines B-D 364-368 are backed up by backup and recovery software 320, as specified by the XML converted list of identifiers of virtual machines.

At a later time, a second backup is performed 416 using the XML converted list of identifiers distributed in step 410 or an XML-converted list having the exact same virtual machine identifiers as that list, for example, because of a time-based distribution trigger that unnecessarily (because the virtual machine identifiers had not changed) redistributed a copy of the XML converted list. Different virtual machine identifiers are not distributed to the cluster backup configurations 352 or 354 between the time the XML converted list was originally distributed and the time the second backup is performed, although the exact same virtual machine identifiers may have been provided as a second XML converted list during such time. However, during such period between the time it was originally distributed and the time the second backup is performed, virtual machine A 362 moved 414 from cluster backup configuration B 354 to cluster backup configuration A 352, and optionally virtual machine C has moved 414 with virtual machine A. During such period, no indication of the move or moves are provided to backup and recovery software 320. Backup and recovery software will perform the second backup using the converted list of identifiers distributed in step 410, and will not back up 416 virtual machine A 362 on cluster backup configuration A 352 but will back up 416 the other virtual machines B-D 364-368. The backup or non-backup of a virtual machine is irrespective of which cluster backup configuration the virtual machine is on, and whether the virtual machine has moved to a different cluster backup configuration between the time the converted list is originally (with respect to any lists containing the same virtual machine identifiers) distributed and when the backup occurs.

In one embodiment, the backup and recovery software 320 may provide a utility that allows identification to such software of one or more individual virtual machines not to be backed up (or only to be backed up) for each cluster backup configuration, but either requires identification of virtual machines that reside on the cluster backup configuration at the time of the use of such utility to identify virtual machines to be backed up or not backed up, or only applies to an individual cluster backup configuration.

In one embodiment, a cluster backup configuration is a cluster.

It is noted that in other embodiments, the XML converted list distributed may be a list of virtual machines to be backed up, with virtual machines not on the list being the ones not backed up. Thus, the list of virtual machines not to be backed up is implied as being any virtual machine not on the list distributed. In this embodiment, the list of virtual machines not to be backed up is considered to be (implicitly) distributed with the list distributed.

Summary of Certain Embodiments

There has been described a method of instructing backup and recovery software, that receives a specification of one of a set of two or more cluster backup configurations on which a virtual machine in two or more virtual machines operates to prevent said backup and recovery software from backing up said virtual machine, to not back up at least one virtual machine in the two or more virtual machines on any of the two or more of cluster backup configurations, including: building, for the plurality of cluster backup configurations, each cluster backup configuration comprising at least one computer system, each computer system in the two or more including at least one of the virtual machines in the two or more, a list of identifiers of each of the at least one virtual machine in the two or more virtual machines that is not to be backed up, the list built so that, for each of the cluster backup configurations in the two or more, the list contains identifiers of: at least one first virtual machine residing on the cluster backup configuration at the time the list is received and that the backup and recovery software is not to back up; at least one second virtual machine not residing on the cluster backup configuration at the time the list is received, but that will move from another cluster backup configuration to said cluster backup configuration, and that the backup and recovery software is not to back up; and at least one third virtual machine not residing on the cluster backup configuration at the time the list is received, and that will not move from another cluster backup configuration to said cluster backup configuration, and that the backup and recovery software is not to back up; and distributing the list to each cluster backup configuration in the two or more.

The method contains an optional feature whereby the list comprises a first format; and the list is built from a different list in a second format, different from the first format.

The method contains an optional feature whereby the different list comprises information that is not included in the list.

The method contains an optional feature whereby the distributing step is responsive to a triggering event. The method contains an optional feature whereby the triggering event comprises a time of day.

The method contains an optional feature whereby the triggering event comprises a change of information on or to be on the list.

Described is a computer implemented system for instructing backup and recovery software, that receives a specification of one of a set of two or more cluster backup configurations on which a virtual machine in two or more virtual machines operates to prevent said backup and recovery software from backing up said virtual machine, to not back up at least one virtual machine in the two or more virtual machines on any of the two or more cluster backup configurations, including:

a list converter including a processor system coupled to a memory system for generating and providing at an output a list of identifiers of each of the at least one virtual machine that is not to be backed up, the list converter generating the list so that for each of the cluster backup configurations in the two or more, the list contains identifiers of: at least one first virtual machine residing on the cluster backup configuration at the time the list is received and that the backup and recovery software is not to back up; at least one second virtual machine not residing on the cluster backup configuration at the time the list is received, but that will move from another cluster backup configuration to said cluster backup configuration, and that the backup and recovery software is not to back up; and at least one third virtual machine not residing on the cluster backup configuration at the time the list is received, and that will not move from another cluster backup configuration to said cluster backup configuration, and that the backup and recovery software is not to back up; and a distribution manager including the processor system coupled to the memory system having an input coupled to the list converter output for receiving the list, the distribution manager having an output coupled to each cluster backup configuration in the two or more, each cluster backup configuration including at least one computer system, each computer system comprising at least one of the virtual machines in the two or more, the distribution manager for distributing via the distribution manager output the list to each cluster backup configuration in the two or more.

The system contains an optional feature whereby: the list converter comprises an input for receiving a different list in a first format; and the list converter generates the list in a second format, different from the first format, using the different list.

The system contains an optional feature whereby the different list comprises information that is not included in the list.

The system may additionally include a distribution trigger sensor having an input coupled to receive trigger event indication, the distribution trigger sensor for providing a signal at an output responsive to the trigger event indication; and contains an optional feature whereby the list converter is has an input coupled to the distribution trigger sensor output for receiving the trigger event indication, and the list converter generates the list responsive to the trigger event indication.

The system contains an optional feature whereby the trigger event indication comprises a time of day.

The system contains an optional feature whereby the triggering event indication comprises a change of information on, or to be on, the list.

Described is a computer program product including a nontransitory computer useable medium having computer readable program code embodied therein for instructing backup and recovery software, that receives a specification of one of a set of two or more cluster backup configurations on which a virtual machine in two or more virtual machines operates to prevent said backup and recovery software from backing up said virtual machine, to not back up at least one virtual machine in the two or more virtual machines on any of the two or more cluster backup configurations, the computer program product including computer readable program code devices configured to cause a computer system to:

build for the two or more cluster backup configurations, each cluster backup configuration in the two or more including at least one computer system, each computer system including at least one of the virtual machines in the two or more, a list of identifiers of each of the at least one virtual machine in the two or more virtual machines that is not to be backed up, the list built so that, for each of the cluster backup configurations in the two or more, the list contains identifiers of: at least one first virtual machine residing on the cluster backup configuration at the time the list is received and that the backup and recovery software is not to back up; at least one second virtual machine not residing on the cluster backup configuration at the time the list is received, but that will move from another cluster backup configuration to said cluster backup configuration, and that the backup and recovery software is not to back up; and at least one third virtual machine not residing on the cluster backup configuration at the time the list is received, and that will not move from another cluster backup configuration to said cluster backup configuration, and that the backup and recovery software is not to back up; and distribute the list to each cluster backup configuration in the two or more.

The computer program product contains an optional feature whereby the list converter comprises an input for receiving a different list in a first format; and the list converter generates the list in a second format, different from the first format, using the different list.

The computer program product contains an optional feature whereby the different list comprises information that is not included in the list.

The computer program product contains an optional feature whereby the computer readable program code devices configured to cause the computer system to distribute are responsive to a triggering event.

The computer program product contains an optional feature whereby the triggering event comprises a time of day.

The computer program product contains an optional feature whereby the triggering event comprises a change of information on or to be on the list.

Other times for the components of the list may be at the time the list is built, instead of the time the list is received.

What is claimed is:

1. A method of instructing backup and recovery software, that receives a specification of one of a set of a plurality of cluster backup configurations on which a virtual machine in a plurality of virtual machines operates to prevent said backup and recovery software from backing up said virtual machine, to not back up at least one of the plurality of virtual machines on any of the plurality of cluster backup configurations, comprising:
   building, for the plurality of cluster backup configurations that each include at least one computer system comprising at least one of the plurality of virtual machines, a list, of a plurality of lists, the plurality of lists being of identifiers of respective ones of the plurality of virtual machines that is not to be backed up, the list built by extracting information from a different list having a different file format from the list so that, for each of the plurality of cluster backup configurations, the list contains identifiers of:
      at least one first virtual machine residing on the cluster backup configuration at a time the list is received and that the backup and recovery software is not to back up;
      at least one second virtual machine not residing on the cluster backup configuration at the time the list is received, but that will move from another cluster backup configuration to said cluster backup configuration, and that the backup and recovery software is not to back up; and
      at least one third virtual machine not residing on the cluster backup configuration at the time the list is received, and that will not move from a different cluster backup configuration to said cluster backup configuration, and that the backup and recovery software is not to back up;
   distributing the list to each of the plurality of cluster backup configurations, in response to a triggering event;
   after a backup is performed for a first cluster backup configuration of the plurality of cluster backup configurations using the list distributed to the first cluster backup configuration, causing the at least one first virtual machine of the first cluster backup configuration to move to a second cluster backup configuration of the plurality of cluster backup configurations to which one of the plurality of lists was distributed prior to the move such that the at least one first virtual machine is moved to become one of the at least one second virtual machine of the second cluster backup configurations; and
   causing the second cluster backup configuration to be backed up responsive to the list distributed to the second cluster backup configuration such that the at least one second virtual machine that was moved is not to be backed up.

2. The method of claim 1, wherein the list is built by extracting the information from the different list such that other information included in the different list is not extracted to the list.

3. The method of claim 1, wherein the triggering event comprises a time of day.

4. The method of claim 1, wherein the triggering event comprises a change of information on or to be on the list.

5. A computer implemented system for instructing backup and recovery software, that receives a specification of one of a set of a plurality of cluster backup configurations on which a virtual machine in a plurality of virtual machines operates to prevent said backup and recovery software from backing up said virtual machine, to not back up at least one of the plurality of virtual machines on any of the plurality of cluster backup configurations, comprising:
   a memory system; and
   processing circuitry coupled to the memory system, the processing circuitry configured to read code from the memory system that, when executed, configures the computer implemented system to,
   build, for the plurality of cluster backup configurations that each include at least one computer system comprising at least one of the plurality of virtual machines, a list, of a plurality of lists, the plurality of lists being of identifiers of respective ones of the plurality of virtual machines that is not to be backed up, the list built by extracting information from a different list having a different file format from the list so that, for each of the plurality of cluster backup configurations, the list contains identifiers of:
      at least one first virtual machine residing on the cluster backup configuration at a time the list is received and that the backup and recovery software is not to back up;
      at least one second virtual machine not residing on the cluster backup configuration at the time the list is received, but that will move from another cluster backup configuration to said cluster backup configuration, and that the backup and recovery software is not to back up; and
      at least one third virtual machine not residing on the cluster backup configuration at the time the list is received, and that will not move from a different cluster backup configuration to said cluster backup configuration, and that the backup and recovery software is not to back up;
   distribute the list to each of the plurality of cluster backup configurations, in response to a triggering event;
   after a backup is performed for a first cluster backup configuration of the plurality of cluster backup configurations using the list distributed to the first cluster backup configuration, cause the at least one first virtual machine of the first cluster backup configuration to move to a second cluster backup configuration of the plurality of cluster backup configurations to which one of the plurality of lists was distributed prior to the move such that the at least one first virtual machine is moved to become one of the at least one second virtual machine of the second cluster backup configurations; and
   cause the second cluster backup configuration to be backed up responsive to the list distributed to the second cluster backup configuration such that the at least one second virtual machine that was moved is not to be backed up.

6. The system of claim 5, wherein the list is built by extracting the information from the different list such that other information included in the different list is not extracted to the list.

7. The system of claim 5, wherein the trigger event indication comprises a time of day.

8. The system of claim 5, wherein the trigger event indication comprises a change of information on, or to be on, the list.

9. A non-transitory computer readable medium having computer readable program code embodied therein for instructing backup and recovery software, that receives a specification of one of a set of a plurality of cluster backup configurations on which a virtual machine in a plurality of virtual machines operates to prevent said backup and recovery software from backing up said virtual machine, to not back up at least one virtual machine in the plurality of virtual machines on any of the plurality of cluster backup configurations, the computer readable program code configured to cause a computer system to:

build, for the plurality of cluster backup configurations that each include at least one computer system comprising at least one of the plurality of virtual machines, a list, of a plurality of lists, the plurality of lists being of identifiers of respective ones of the plurality of virtual machines that is not to be backed up, the list built by extracting information from a different list having a different file format from the list so that, for each of the plurality of cluster backup configurations, the list contains identifiers of:

at least one first virtual machine residing on the cluster backup configuration at a time the list is received and that the backup and recovery software is not to back up;

at least one second virtual machine not residing on the cluster backup configuration at the time the list is received, but that will move from another cluster backup configuration to said cluster backup configuration, and that the backup and recovery software is not to back up; and at least one third virtual machine not residing on the cluster backup configuration at the time the list is received, and that will not move from a different cluster backup configuration to said cluster backup configuration, and that the backup and recovery software is not to back up;

distribute the list to each of the plurality of cluster backup configurations, in response to a triggering event;

after a backup is performed for a first cluster backup configuration of the plurality of cluster backup configurations using the list distributed to the first cluster backup configuration, cause the at least one first virtual machine of the first cluster backup configuration to move to a second cluster backup configuration of the plurality of cluster backup configurations to which one of the plurality of lists was distributed prior to the move o such that the at least one first virtual machine is moved to become one of the at least one second virtual machine of the second cluster backup configurations; and cause the second cluster backup configuration to be backed up responsive to the list distributed to the second cluster backup configuration such that the at least one second virtual machine that was moved is not to be backed up.

10. The non-transitory computer readable medium of claim 9, wherein the list is built by extracting the information from the different list such that other information included in the different list is not extracted to the list.

11. The non-transitory computer readable medium of claim 9, wherein the triggering event comprises a time of day.

12. The computer program product non-transitory computer readable medium of claim 9, wherein the triggering event comprises a change of information on or to be on the list.

\* \* \* \* \*